Figure 1:
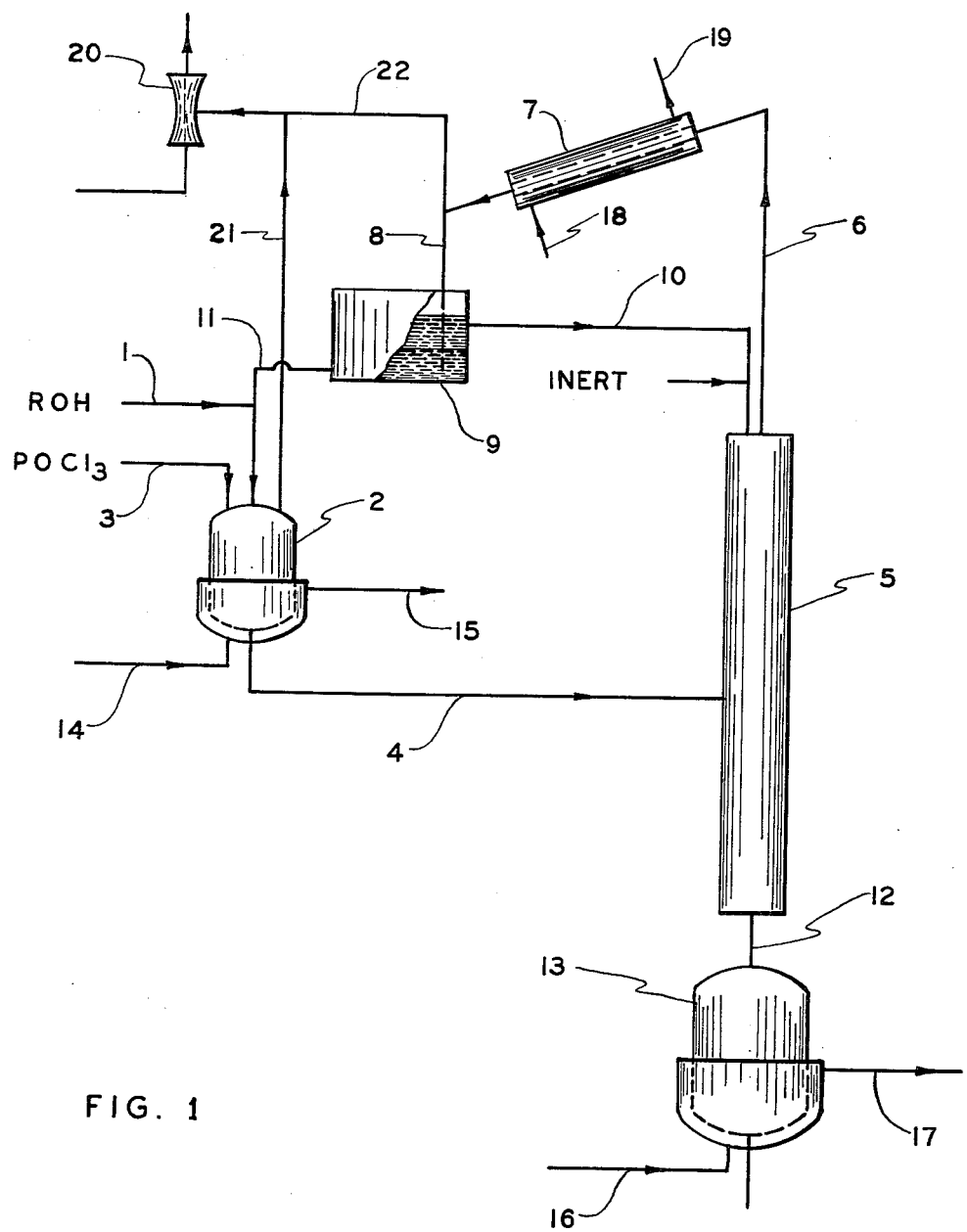

INVENTORS
HAROLD SORSTOKKE
RICHARD POTTKOTTER

United States Patent Office

3,079,419
Patented Feb. 26, 1963

3,079,419
PROCESS FOR THE MANUFACTURE OF TRIALKYL PHOSPHATES
Harold Sorstokke, Homewood, and Richard Pottkotter, Chicago Heights, Ill., assignors to Stauffer Chemical Company, New York, N.Y., a corporation of Delaware
Filed Dec. 7, 1960, Ser. No. 74,343
8 Claims. (Cl. 260—461)

This invention relates to the manufacture of trialkyl phosphates. In particular, this invention relates to a process whereby trialkyl phosphates are manufactured from phosphorus oxychloride and alcohol economically and in high yield using an inert refluxing azeotrope to remove by-products and excess reactants.

A number of methods have been previously proposed to prepare trialkyl phosphates. As in the case of most phosphate or phosphite esters, the principal problem has been to isolate the desired product in a relatively pure state before undesirable side reactions can take place. In most cases this simply means the quick removal of by-product hydrogen chloride and excess alcohol.

Among the methods previously proposed to remove hydrogen chloride have been the use of ammonia, vacuum stripping, film evaporation, etc. All of these methods have certain inherent disadvantages, however, so that none is entirely satisfactory. Ammonia addition, for instance, requires close process control to avoid formation of phosphoramidates and attendant lower yields. Vacuum stripping to completely remove the HCl is time consuming and requires refrigerated condensers to avoid excessive losses of excess alcohol which is carried out by the evolving gases. Film evaporation requires expensive specialized equipment.

We have now found that these prior difficulties may be overcome, and a good yield of high quality trialkyl phosphate produced, by means of the process of the present invention. Briefly described, this process comprises reacting phosphorus oxychloride ($POCl_3$) with an excess of an alcohol and then conducting the reactants to a stripping column. This column is a fractionating column in which an inert solvent is constantly refluxing under conditions which cause the separation of the desired product from the by-products and excess reactants.

It is the selection of the refluxing inert solvent which determines the success of our process for making the various trialkyl phosphates. The ideal solvent is one which is completely inert with respect to the reactants and by-products, is low boiling to the extent that it is easily separated from the trialkyl phosphate product, is an azeotrope former with the excess alcohol and hydrogen chloride by-product, and is immiscible with the hydrogen chloride saturated excess alcohol after condensation of the azeotrope vapors. Although it is not essential, as regards product quality, that the inert solvent be both an azeotrope former and immiscible after condensation, it is certainly preferable from a processing standpoint.

The principal value in the use of an azeotrope former is that such azeotrope generally boils at a lower temperature. Although reflux temperature can be controlled to some extent by lowering the pressure on the system, it is helpful to use the lowest temperatures conveniently available.

Among the inert solvents which we have found suitable for use in our invention are toluene, which forms suitable azeotropes with methanol, ethanol, propanol and sec-butanol; xylene, which forms suitable azeotropes with normal and iso-butanol; benzene, which forms azeotropes with methanol, ethanol, iso-propanol, and tert-butanol; and chlorobenzene, which forms azeotropes with normal propanol and normal and iso-butanol.

Referring now to FIGURE 1, our invention may be described as follows:

An excess of alcohol is first charged through line 1 into jacketed reactor 2. This reactor is suitably equipped with an agitator and the temperature of the charge may be controlled by means of a cooling liquid entering the cooling jacket through line 14 and leaving through line 15. Phosphorus oxychloride is then added at a controlled rate through line 3. The rate should be controlled so that the temperature is held between about $-10°$ C. and about $60°$ C. Evolved HCl is removed through line 21 during this reaction. After the reaction is complete, the trialkyl phosphate-alcohol-HCl mixture is passed continuously through line 4 into fractionating column 5. In column 5 an inert liquid is continuously refluxing under conditions such that (a) HCl is immediately stripped from the trialkyl phosphate, (b) excess alcohol is removed from the product and (c) the higher boiling trialkyl phosphate is separated and passes to the bottom of the column. During the course of these simultaneous processes, the excess alcohol, HCl, and some of the inert refluxing liquid pass out the top of the column through line 6 into condenser 7. This condenser 7 is cooled by means of a liquid entering the cooling jacket at line 18 and leaving at line 19 so as to recover the excess alcohol and inert liquid. By-product HCl escapes through line 22 which optionally may be connected to a vacuum source 20 and/or a recovery system. The condensed alcohol and inert solvent pass through line 8 into separator 9. In the separator, if one of the preferred alcohol immiscible liquids is used, the condensate separates into two layers. The alcohol, saturated with HCl, normally forms a bottom layer and is returned through line 11 to be used in subsequent charges. The inert solvent is constantly returned to the column 5 through line 10. At the same time the trialkyl phosphate product and some of the inert liquid pass through line 12 into collecting tank 13. This tank also acts as a reboiler to supply heat to the column 5 by boiling off and returning the inert liquid countercurrently through line 12. Heat for this operation is supplied by a heating liquid entering the jacket at line 16 and leaving at line 17.

It will be obvious from an examination of the process and equipment that the process of this invention may be run either continuously or batchwise. It is also possible to run the column on a continuous basis and add the trialkyl phosphate mixture batchwise. In this event two reactors can be used to feed the same column.

The temperature at which various parts of this process will perform are not extremely critical. The $POCl_3$-alcohol reaction is preferably run at as low a temperature as is economically convenient. This temperature, of course, is also determined by the rate of $POCl_3$ addition. In general, temperatures in the range of $-10°$ C. to $60°$ C. have been found satisfactory. The temperature of the stripping column is, of course, dependent upon the inert solvent used, the boiling point of the alcohol-solvent azeotrope if any, the pressure or vacuum in the system, etc. We have operated successfully at temperatures in the range of $20°-100°$ C. For example, a methanol-toluene azeotrope boils at $40°$ C. at 100 mm. pressure; an ethanol-toluene azeotrope boils at $76.7°$ C.; an isopropanol-benzene azeotrope boils at $71.9°$ C., and isopropanol-toluene at $80.6°$ C.; an n-propanol-chlorobenzene azeotrope boils at $96.9°$ C., and n-propanol-meta xylene at $97.1°$ C. All of these temperatures may be lowered by increasing the vacuum on the system if desired.

The amount of inert solvent may vary considerably depending on the amount of excess alcohol, azeotrope proportions, reflux ratio, etc. Generally, an amount in the range of one to five times the amount of excess alcohol has been found satisfactory. Preferred proportions are easily determined in each instance according to the product being made and the equipment being used.

In the event that a vacuum pump or ejector is used to control the pressure of the system and thereby the temperature, certain well-known modifications should be made in the equipment. For instance a vacuum seal would need to be included between the condenser discharge line 8 and the separator 9.

It is preferred to use excess alcohol in this reaction. At least 10 to 20% excess is necessary in all cases to obtain good yields and in some cases, particularly when making trimethyl phosphate, large excesses up to 200% are preferred.

The following examples illustrate the process of our invention:

*Example 1.—Preparation of Trimethyl Phosphate*

To a reactor equipped with a cooling jacket and agitator was charged 112 lbs. of methanol which was then cooled to 0° C. Sixty lbs. of POCl$_3$ was then added at 0°–3° C. After the addition was complete the charge was held at 0° C. for two hours while vacuum was applied to lower the pressure to 20 mm. Hg absolute. Considerable HCl was removed during this period. This mixture was then added to the center of a packed column in which toluene was refluxing under an absolute pressure of 100 mm. Hg from a still pot originally charged with 150 pounds of toluene. During this time the boil up rate was such that the still pot vapor temperature was at least 52° C. and the column top temperature was about 40° C. as controlled by the azeotrope composition. HCl was rapidly and thoroughly removed and evacuated under these conditions. The azeotrope distillate separated into two layers and the upper toluene layer was returned to the column as reflux. The lower layer containing some toluene, and HCl saturated methanol was re-used in subsequent charges. The product removed from the bottom of the column was stripped of toluene to give 51.8 pounds (94.7% yield) of trimethyl phosphate. This product had a Baumé of 25.5 and an acidity equivalent to 0.3 ml. N/10 NaOH/10 grams. A second similar charge gave a yield of 88.5% of product having an acidity of 0.1 ml. N/10 NaOH/10 grams. Two more charges were made using recovered methanol containing HCl and resulted in yields of 87.5% and 86%. Both of these products had acidities of 0.1 ml. N/10 NaOH/10 grams.

*Example 2.—Preparation of Trimethyl Phosphate*

To 288.4 grams (9 moles—200% excess) of methanol at 0° C. were added, with stirring over a three hour period, 153.4 grams (1 mole) of POCl$_3$. A reduced pressure of 20 mm. of vacuum was maintained during the addition to aid in removing evolved HCl. After addition, the charge was stirred for two hours at 0° C. while the pressure was reduced to 35 mm. Hg absolute. This cold reaction mixture was then fed slowly into the center of a 30 inch packed column through which xylene was distilling at a pressure of 50 mm. Hg absolute. This led to a rapid removal of the HCl. Four parts of xylene were used for one part of alcohol and the column temperature at the feed point was between 50°–62° C. during the addition. The product passing out the bottom contained some xylene. In order to check the purity, the xylene was stripped off and the product distilled at a vapor temperature of 37°–42° C. at a pressure of 1–2 mm. Hg absolute. The product weighed 101.5 grams and had an index of refraction $N_D^{25}=1.3958$.

*Example 3.—Preparation of Tributyl Phosphate*

To 667.2 grams (9 moles—200% excess) of butanol at 40° C. were added 153.4 grams (1 mole) of POCl$_3$ with stirring over a three hour period. The pressure on the system was maintained at 50 mm. Hg absolute. After the addition was complete the charge was stirred for two hours at the same temperature and pressure. The mixture was then cooled to 0° C. and fed into the stripping column under the same conditions as in Example 2. The product, after stripping of xylene, weighed 226 grams and had an index of refraction $N_D^{25}=1.4226$.

The chemical compounds used in our invention are readily available and the ordinary commercial grades may be used.

The foregoing description is given for clearness of understanding only and no unnecessary limitations should be derived therefrom.

We claim:
1. In the process for producing trialkyl phosphates by the reaction of phosphorus oxychloride with excess alcohol, the improvement which comprises passing the resulting mixture into a fractionating column containing a refluxing inert solvent, removing a low boiling mixture of said alcohol, said solvent and hydrogen chloride from the top of said column, and recovering a crude trialkyl phosphate stream from the bottom of the column.

2. A process as in claim 1 wherein the refluxing inert solvent is toluene.

3. A process as in claim 1 wherein the refluxing inert solvent is xylene.

4. In the process for producing trialkyl phosphates by the reaction of phosphorus oxychloride with excess alcohol, at a temperature between about −10° C. and about 60° C., the improvement which comprises passing the resulting mixture into a fractionating column containing an inert solvent refluxing at a temperature between about 20° C. and about 100° C., removing a low boiling mixture of said alcohol, said solvent and hydrogen chloride from the top of said column and recovering a crude trialkyl phosphate stream from the bottom of said column.

5. A process as in claim 4 wherein the refluxing inert solvent is toluene.

6. A process as in claim 4 wherein the refluxing inert solvent is xylene.

7. In the process for producing trimethyl phosphates by the reaction of phosphorus oxychloride with excess methanol, at a temperature between about −10° C. and about 60° C., the improvement which comprises passing the resulting mixture into a fractionating column containing refluxing toluene at a temperature between about 20° C. and about 100° C., removing a low boiling mixture of methanol, toluene and hydrogen chloride from the top of said column, and recovering a crude trimethyl phosphate stream from the bottom of said column.

8. In the process for producing tributyl phosphates by the reaction of phosphorus oxychloride with excess butanol, at a temperature between about −10° C. and about 60° C., the improvement which comprises passing the resulting mixture into a fractionating column containing refluxing xylene at a temperature between about 20° C. and about 100° C., removing a low boiling mixture of butanol, xylene and hydrogen chloride from the top of said column, and recovering a crude tributyl phosphate stream from the bottom of said column.

References Cited in the file of this patent

UNITED STATES PATENTS

| | | |
|---|---|---|
| 1,766,720 | Nicolai | June 24, 1930 |
| 2,624,750 | Pechukas | Jan. 6, 1953 |